(12) United States Patent
Ryu

(10) Patent No.: US 12,168,395 B2
(45) Date of Patent: Dec. 17, 2024

(54) VIBRATION-PROOF BUSH

(71) Applicant: NOK CORPORATION, Tokyo (JP)

(72) Inventor: Yoshihisa Ryu, Tottori (JP)

(73) Assignee: NOK CORPORATION, Tokyo (JP)

( * ) Notice: Subject to any disclaimer, the term of this patent is extended or adjusted under 35 U.S.C. 154(b) by 191 days.

(21) Appl. No.: 17/790,185

(22) PCT Filed: Mar. 17, 2021

(86) PCT No.: PCT/JP2021/010838
§ 371 (c)(1),
(2) Date: Jun. 30, 2022

(87) PCT Pub. No.: WO2021/200160
PCT Pub. Date: Oct. 7, 2021

(65) Prior Publication Data
US 2023/0049995 A1     Feb. 16, 2023

(30) Foreign Application Priority Data

Apr. 2, 2020  (JP) .................. 2020-066872

(51) Int. Cl.
*B60K 17/24* (2006.01)
*F16F 1/373* (2006.01)
(Continued)

(52) U.S. Cl.
CPC ............ *B60K 17/24* (2013.01); *F16F 1/3732* (2013.01); *F16F 15/1217* (2013.01); *F16F 15/124* (2013.01)

(58) Field of Classification Search
CPC .... B60K 17/24; F16F 15/124; F16F 15/1217; F16F 1/3732; F16F 1/3842; F16F 2230/24; F16F 2230/0041; F16F 2226/044

See application file for complete search history.

(56) References Cited

U.S. PATENT DOCUMENTS 3,016,562 A * 1/1962 Reid .................. F16L 5/00
                                                    29/451
4,033,535 A * 7/1977 Moran ............... H02G 3/0658
                                                    439/449

(Continued)

FOREIGN PATENT DOCUMENTS

JP          5-58988 U      8/1993
JP       2003-042217      2/2003
(Continued)

OTHER PUBLICATIONS

International Search Report issued in International Patent Application No. PCT/JP2021/010838, dated May 25, 2021, along with an English translation thereof.
(Continued)

*Primary Examiner* — Vishal R Sahni
(74) *Attorney, Agent, or Firm* — GREENBLUM & BERNSTEIN, P.L.C.

(57) ABSTRACT

A vibration-proof bush capable of suppressing incomplete fitting of an upper bush and a lower bush. The vibration-proof bush includes an upper bush configured to be mounted on a vehicle body side and a lower bush configured to be fitted to the upper bush are provided, wherein the vibration-proof bush includes interference portions configured to interfere with each other in a process of fitting the lower bush to the upper bush, and the interference portions form a fitting-sound generation structure in which a sound is generated, when the lower bush is fitted to the upper bush during temporary assembling.

3 Claims, 4 Drawing Sheets

(51) Int. Cl.
*F16F 15/121* (2006.01)
*F16F 15/124* (2006.01)

(56) References Cited

U.S. PATENT DOCUMENTS

| | | | | |
|---|---|---|---|---|
| 5,069,586 A | * | 12/1991 | Casey | F16B 5/01 |
| | | | | 411/908 |
| 6,491,279 B1 | | 12/2002 | Iwano | |
| 7,185,873 B2 | | 3/2007 | Suka et al. | |
| 9,546,704 B2 | * | 1/2017 | Yasui | F16F 1/3732 |
| 2013/0336741 A1 | * | 12/2013 | Park | B60S 1/045 |
| | | | | 411/337 |
| 2015/0330472 A1 | * | 11/2015 | Yasui | B60N 2/72 |
| | | | | 403/229 |
| 2022/0234405 A1 | * | 7/2022 | Heidemann | B60G 7/04 |

FOREIGN PATENT DOCUMENTS

| | | |
|---|---|---|
| JP | 2003-104077 A | 4/2003 |
| JP | 2007-237949 A | 9/2007 |
| JP | 2008-132803 A | 6/2008 |
| JP | 2011-131822 A | 7/2011 |
| JP | 2019-19934 A | 2/2019 |

OTHER PUBLICATIONS

Extended European Search Report issued in EP Application No. 21780802.1, dated Mar. 7, 2024.
China Office Action received in CN Application No. 202180009276.4, dated May 31, 2024.

* cited by examiner

VIBRATION-PROOF BUSH

TECHNICAL FIELD

The present disclosure relates to a vibration-proof bush provided in a center bearing support.

BACKGROUND ART

A propeller shaft provided in a vehicle body includes a center bearing support which supports a center bearing thereof. This suppresses transmission of vibration generated in the propeller shaft to a vehicle body (body of a vehicle) side and reduces a noise such as muffled sound in a cabin. Moreover, in the center bearing support, in order to improve an effect to suppress the transmission of vibration from the propeller shaft, a technology of providing a vibration-proof bush on a bracket mounted on a vehicle body side is also known. In the technology as above, the center bearing support is mounted on the vehicle body by fixing the bracket together with the vibration-proof bush to the vehicle body by a bolt. Here, by forming a hole formed in the bracket (hole through which a shaft of the bolt is inserted) into a long hole, dimensional errors of various components in a front-and-rear direction of the vehicle body are absorbed. In this structure, when the various components are to be mounted on the vehicle body, first, the center bearing support is mounted on the propeller shaft and then, both ends of the propeller shaft are mounted on the vehicle body. Then, lastly, while position adjustment is being conducted so that the dimensional errors are absorbed, the bracket is mounted together with the vibrations-proof bush on the vehicle body by the bolt.

Here, the vibration-proof bush includes an upper bush mounted on the vehicle body side and a lower bush provided on a side opposite to the upper bush with respect to the bracket. In order to mount the bracket on the vehicle body together with the vibration-proof bush at a last stage, such methods have been conventionally employed that, the upper bush is temporarily fixed to the vehicle body side and then, in a state where the lower bush is disposed on the bracket, by means of screwing by the bolt, the bracket is fixed to the vehicle body and, at the same time, the vibration-proof bush is assembled. However, depending on dimensions of the various components and the like, such methods cannot be employed in some cases. Thus, such method has been considered that an upper bush and a lower bush that are fitted to each other are temporarily fixed to the bracket in advance as a vibration-proof bush. However, in this method, if the fitting between the upper bush and the lower bush is not complete, there is a concern that the vibration-proof bush is removed from the bracket during operation, which lowers operation performance.

CITATION LIST

Patent Literature

[PTL 1]
Japanese Patent Application Publication No. 2008-132803
[PTL 2]
Japanese Patent Application Publication No. 2011-131822
[PTL 3]
Japanese Patent Application Publication No. 2019-19934

SUMMARY OF INVENTION

Technical Problem

An object of the present disclosure is to provide a vibration-proof bush capable of suppressing removal caused by incomplete fitting when an upper bush and a lower bush are temporarily assembled.

Solution to Problem

The present disclosure employs the following means in order to achieve the above object.

The present disclosure is related to a vibration-proof bush provided in a center bearing support which supports a center bearing of a propeller shaft, including:
  an upper bush configured to be mounted on a vehicle body side; and
  a lower bush configured to be fitted to the upper bush, wherein
  the vibration-proof bush includes interference portions configured to interfere with each other in a process of fitting the lower bush to the upper bush, and the interference portions form a fitting-sound generation structure in which a sound is generated when the lower bush is fitted to the upper bush during temporary assembling.

According to the present disclosure, since the interference portions form the fitting-sound generation structure, when the lower bush is fitted to the upper bush during the temporary assembling, a sound is generated. As a result, an operator can easily confirm that they are fitted to each other. Therefore, incomplete fitting of the upper bush and the lower bush can be suppressed.

The interference portions may have protrusions provided on both the upper bush and the lower bush, respectively, so that the protrusions are deformed by pressing each other in the process of fitting the lower bush to the upper bush during the temporary assembling, and the sound is generated by the protrusions returning to their original shapes when the fitting is completed.

Among the protrusions constituting the interference portion, the protrusion provided on either one of the upper bush and the lower bush may have an annular protrusion, and the protrusion provided on the other may have non-annular protrusions provided in plural at intervals in a circumferential direction.

When the protrusion provided on the other of the upper bush and the lower bush has the non-annular protrusions provided in plural at the intervals in the circumferential direction, a clearance formed between the adjacent non-annular protrusions allows effective propagation of the sound to an outside.

The upper bush may have a first inner ring, a first outer ring provided concentrically with the first inner ring, and a first elastic body provided integrally with the first inner ring and the first outer ring,
the lower bush may have a second inner ring, a second outer ring provided concentrically with the second inner ring, and a second elastic body provided integrally with the second inner ring and the second outer ring; and
an outer peripheral surface of the first elastic body and an inner peripheral surface of the second elastic body may be configured to be fitted to each other, and the annular protrusion may be provided on the outer peripheral surface of the first elastic body, and a plurality of the non-annular protrusions may be provided on the inner peripheral surface of the second elastic body.

The non-annular protrusion may include a first inclined surface in which a distance from a center axis of the lower bush increases as a distance from the upper bush increases, and a second inclined surface in which a distance from the center axis increases as a distance from the upper bush decreases, the second inclined surface being provided closer to the upper bush than the first inclined surface; and an inclination angle of the first inclined surface with respect to a plane perpendicular to the center axis may be larger than an inclination angle of the second inclined surface with respect to the plane perpendicular to the center axis.

Advantageous Effects of Invention

As described above, according to the present disclosure, removal caused by incomplete fitting when the upper bush and the lower bush are temporarily assembled can be suppressed.

DESCRIPTION OF EMBODIMENTS

Figure 1:
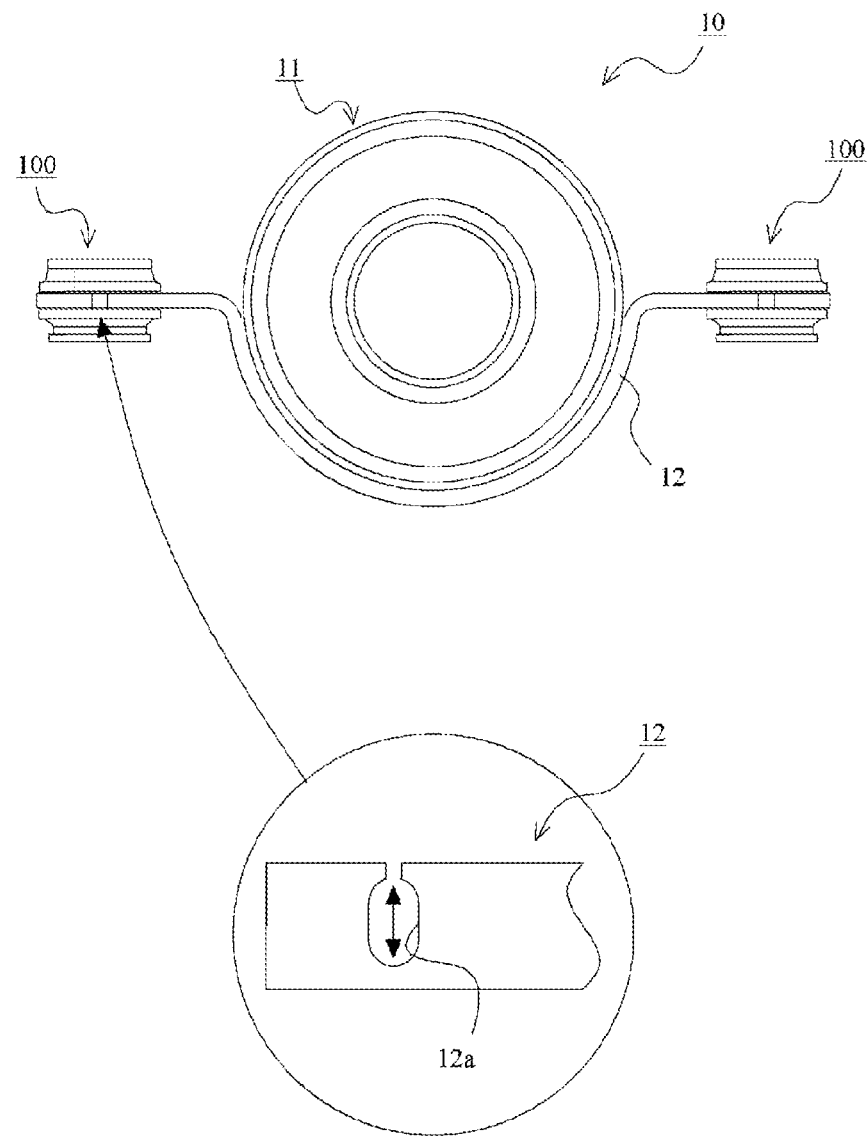
FIG. 1 is a view of an appearance of a center bearing support according to an embodiment of the present disclosure.

Hereinafter, by referring to the drawings, an aspect for embodying the present disclosure will be described in detail exemplarily on the basis of an embodiment. However, dimensions, materials, shapes, relative dispositions, and the like of constituent components thereof described in this embodiment are not intended to limit a range of the present disclosure only to them unless otherwise particularly described specifically.

Embodiment

Figure 2:
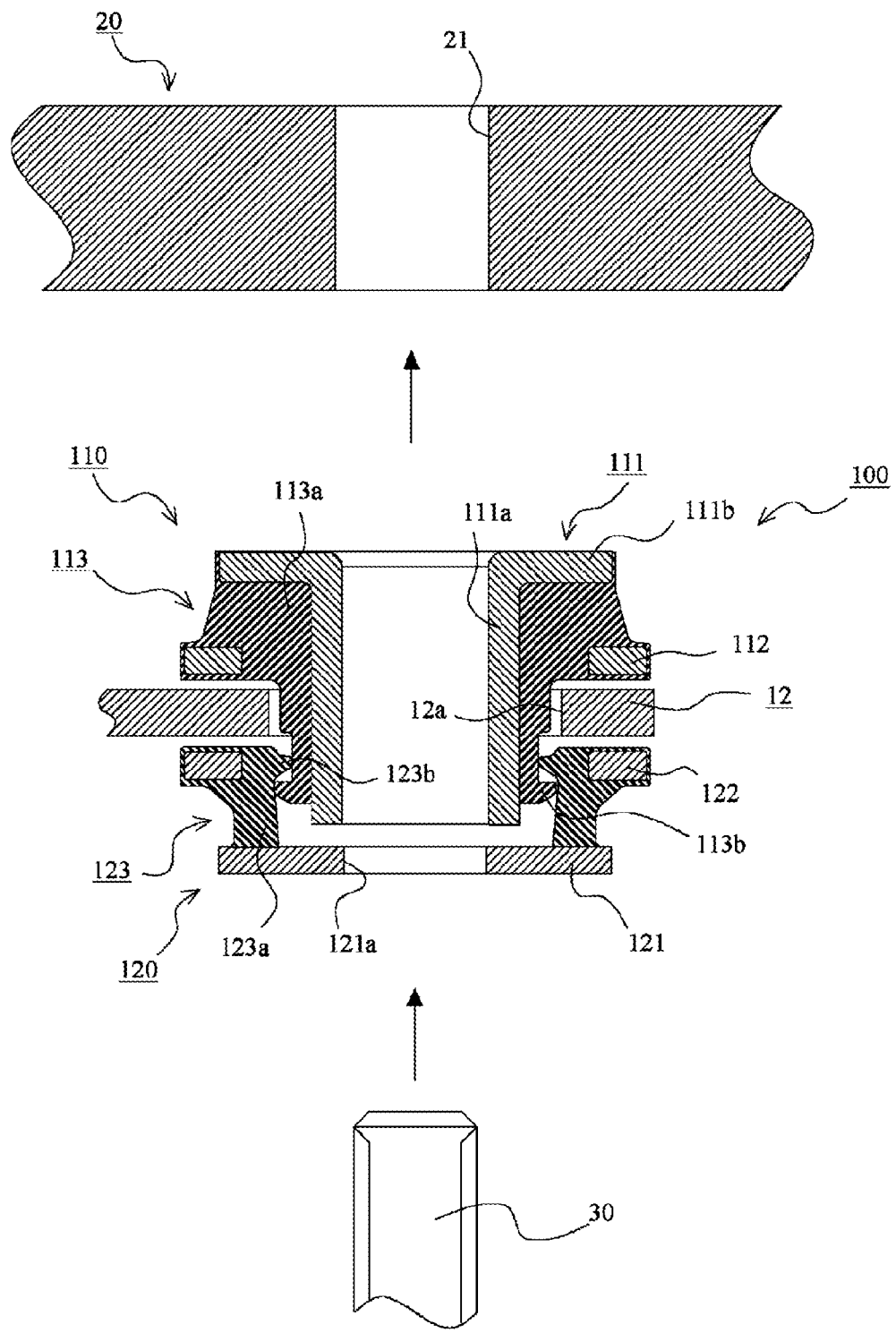
FIG. 2 is a sectional view illustrating a state where a vibration-proof bush according to the embodiment of the present disclosure is being mounted on a vehicle body.
Figure 3:
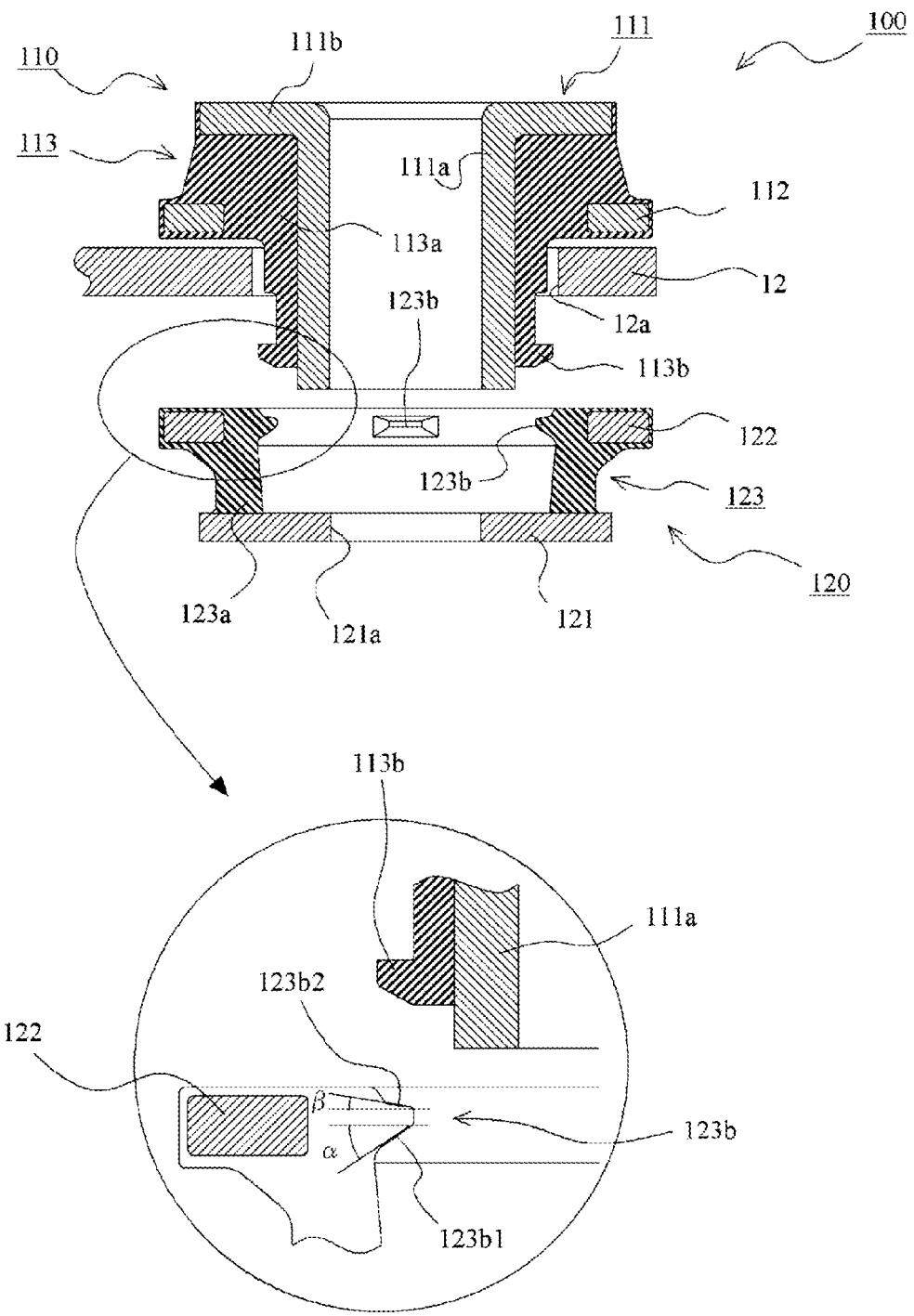
FIG. 3 is a sectional view illustrating a state where the vibration-proof bush according to the embodiment of the present disclosure is being assembled.

By referring to FIGS. 1 to 4, a vibration-proof bush according to the embodiment of the present disclosure will be described. FIG. 1 is a view of an appearance of a center bearing support according to the embodiment of the present disclosure, illustrating a front view of the center bearing support and an enlarged view of a part of a bracket in the center bearing support. FIG. 2 is a sectional view illustrating a state where the vibration-proof bush according to the embodiment of the present disclosure is being mounted on a vehicle body. FIG. 3 is a sectional view illustrating a state where the vibration-proof bush according to the embodiment of the present disclosure is being assembled. In FIG. 3, together with the sectional view of the entire vibration-proof bush, an enlarged sectional view of a part, which is circled, of the vibration-proof bush is illustrated. FIG. 4 is a diagram for explaining the mechanism for of a fitting-completion sound according to the embodiment of the present disclosure. The vibration-proof bush has a substantially rotationally symmetrical shape, and in FIGS. 2 to 4, a section of various members by a plane including a center axis of the vibration-proof bush is schematically illustrated.

Mounting of Center Bearing Support on Vehicle Body Side

By referring to FIGS. 1 and 2, a mounting method of the center bearing support 10 according to this embodiment on the vehicle body side (a body of the vehicle) will be described. A circled part in FIG. 1 illustrates a part of a bracket 12 before a vibration-proof bush 100 is mounted in an enlarged manner. As illustrated in this figure, a long hole 12a is provided in the bracket 12. Configuring the hole formed in the bracket 12 as the long hole 12a allows dimensional errors of the various components in a front-and-rear direction of the vehicle body to be absorbed. That is, when the various components are being mounted on the vehicle body, the center bearing support 10 (center-bearing support main body 11) is mounted on a propeller shaft (not shown), and then, both ends of the propeller shaft are mounted on the vehicle body. Then, lastly, while positional adjustment is conducted so as to absorb the dimensional errors, the bracket 12 is mounted together with the vibration-proof bush 100 on a body 20 of the vehicle by a bolt. Note that FIG. 2 illustrate a structure in which the vibration-proof bush 100 and the bracket 12 are mounted on the body 20 by tightening a shaft portion 30 (male screw) of the bolt to a female screw 21 provided on the body 20. However, another structure may be used in which the vibration-proof bush 100 and the bracket 12 are mounted on the body 20 by tightening a nut to the male screw provided on the body side (a structure in which the bolt is embedded in the body, for example).

Vibration-Proof Bush

By referring to FIGS. 2 and 3, the configuration of the vibration-proof bush 100 according to this embodiment will be described. The vibration-proof bush 100 according to this embodiment has an upper bush 110 mounted on the vehicle body side and a lower bush 120 configured to be fitted to the upper bush 110. The lower bush 120 is disposed on a side opposite to the upper bush 110 with respect to the bracket 12. The vibration-proof bush 100 according to this embodiment is provided with interference portions which interfere with each other in a process in which the lower bush 120 is fitted to the upper bush 110. The interference portions form a structure for generating a fitting-sound which is configured to generate a sound when the lower bush 120 is fitted to the upper bush 110 during temporary assembling. Details of the structure for generating the fitting-sound will be described later.

The upper bush 110 has a first inner ring 111, a first outer ring 112 provided concentrically with the first inner ring 111, and a first elastic body 113 provided integrally with the first inner ring 111 and the first outer ring 112. The first inner ring 111 is an annular member constituted by metal or the like having a cylindrical portion 111a and an outward flange portion 111b provided on one end of the cylindrical portion 111a. The shaft portion 30 of the bolt is configured to be inserted inside the cylindrical portion 111a. The outward flange portion 111b is configured to abut against the body 20 of the vehicle. The first outer ring 112 is a flat-washer shaped member constituted by metal or the like. The first outer ring 112 allows the upper bush 110 to be stably supported by the bracket 12. The first elastic body 113 is constituted by an elastic body such as rubber. The first elastic body 113 includes an annular portion 113a exerting a vibration-proof function and an annular protrusion 113b provided on an outer peripheral surface of the annular portion 113a. The upper bush 110 integrally having the first inner ring 111, the first outer ring 112, and the first elastic body 113 can be obtained by performing insert molding by using the first inner ring 111 and the first outer ring 112 as insert components.

The lower bush 120 has a second inner ring 121, a second outer ring 122 provided concentrically with the second inner ring 121, and a second elastic body 123 provided integrally with the second inner ring 121 and the second outer ring 122. The second inner ring 121 is a flat-washer shaped member constituted by metal or the like. The shaft portion 30 of the bolt is configured to be inserted inside the second inner ring 121 (inside an inner peripheral surface 121a). The second outer ring 122 is a flat-washer shaped member constituted by metal or the like. The second outer ring 122 allows the lower bush 120 to be stably supported by the bracket 12. The second elastic body 123 is constituted by an elastic body such as rubber. The second elastic body 123 includes an annular portion 123a exerting the vibration-proof function and a plurality of non-annular protrusions 123b provided on an inner peripheral surface of the annular portion 123a. The plurality of non-annular protrusions 123b are provided at intervals in a circumferential direction. In this embodiment, four non-annular protrusions 123b are disposed at equal intervals. The lower bush 120 integrally having the second inner ring 121, the second outer ring 122, and the second elastic body 123 can be obtained by performing insert molding by using the second inner ring 121 and the second outer ring 122 as insert components.

The vibration-proof bush 100 according to the embodiment is configured such that the fitting is performed between the outer peripheral surface of the first elastic body 113 in the upper bush 110 and the inner peripheral surface of the second elastic body 123 in the lower bush 120. As described above, the annular protrusion 113b is provided on the outer peripheral surface of the first elastic body 113, and the plurality of non-annular protrusions 123b are provided on the inner peripheral surface of the second elastic body 123. The annular protrusion 113b provided on the first elastic body 113 and the plurality of non-annular protrusions 123b provided on the second elastic body 123 function as the interference portions which interfere with each other in the process in which the lower bush 120 is fitted to the upper bush 110.

Figure 4A:
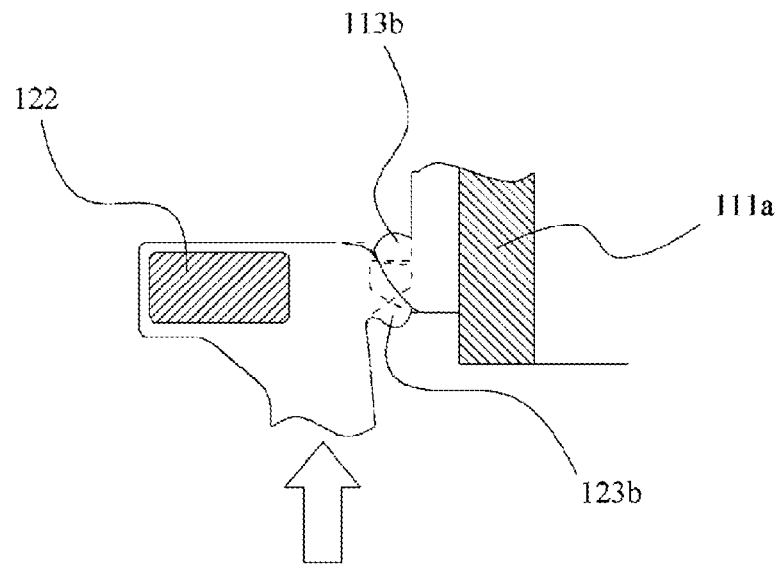
FIGS. 4A and 4B are diagrams for explaining a mechanism for generation of a fitting-completion sound according to the embodiment of the present disclosure.
Figure 4B:
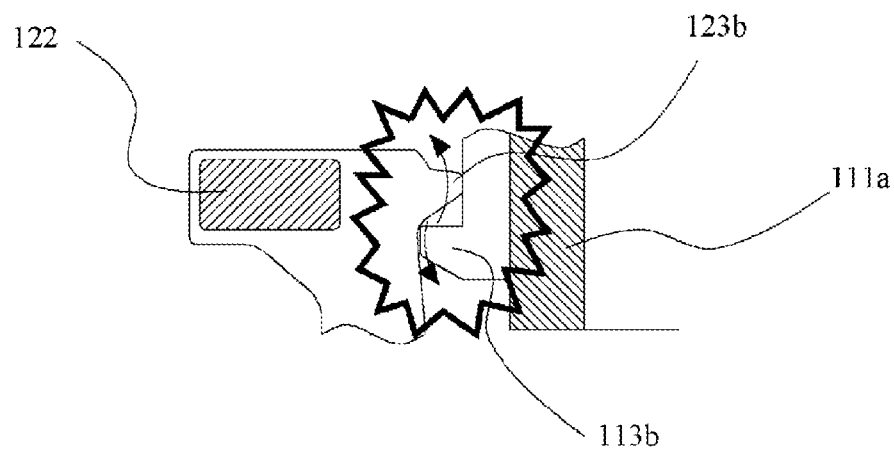

This point will be described in detail by referring to FIG. 4. The above-described annular protrusion 113b and the non-annular protrusion 123b are deformed by pressing each other in the process of fitting when the lower bush 120 is temporarily assembled with the upper bush 110. in FIG. 4(a), the annular protrusion 113b and the non-annular protrusion 123b deformed by pressing each other are indicated by solid lines, while a state before the deformation is indicated by dotted lines. At a moment when the upper bush 110 and the lower bush 120 are fitted to each other (a moment when the non-annular protrusion 123b overrides the annular protrusion 113b), the annular protrusion 113b and the non-annular protrusion 123b both return to original shapes. The annular protrusion 113b and the non-annular protrusion 123b are configured to generate a sound when they rapidly return to the original states as they are flipped by elastic restoring forces (see FIG. 4B).

As described above, the interference portions constituted by the protrusions (the annular protrusion 113b and the plurality of non-annular protrusions 123b) provided on both the upper bush 110 and the lower bush 120, respectively, form the fitting-sound generation structure in which a sound is generated when the lower bush 120 is fitted to the upper bush 110. In regard to the annular protrusion 113b and the plurality of non-annular protrusions 123b, dimensional shapes, rigidity (materials of the first elastic body 113 and the second elastic body 123) and the number of the non-annular protrusions 123b and the like may be set as appropriate so that the sound is generated when the lower bush 120 is fitted to the upper bush 110 during temporary assembling.

The non-annular protrusion 123b in the lower bush 120 according to the embodiment includes a first inclined surface 123b1 and a second inclined surface 123b2 provided closer to the upper bush 110 than the first inclined surface 123b1. The first inclined surface 123b1 is configured to go away from the center axis of the lower bush 120 as it goes away from the upper bush 110. The second inclined surface 123b2 is configured to go away from the center axis of the lower bush 120 as it goes closer to the upper bush 110. An inclination angle $\alpha$ of the first inclined surface 123b1 with respect to a plane perpendicular to the center axis of the lower bush 120 is larger than an inclination angle $\beta$ of the second inclined surface 123b2 with respect to the plane perpendicular to the center axis (see FIG. 3).

Advantageous Points of Vibration-Proof Bush According to this Embodiment

According to the vibration-proof bush 100 according to the embodiment, since the interference portion forms the fitting-sound generation structure, when the lower bush 120 is fitted to the upper bush 110 during the temporary assembling, a sound is generated. This allows an operator to easily confirm that they are fitted. This suppresses incomplete fitting of the upper bush 110 and the lower bush 120. As a result, during an operation of mounting the center bearing support 10 on the vehicle body or the like, removal of the vibration-proof bush 100 from the bracket 12 of the center bearing support 10 can be suppressed. Therefore, operation performance can be improved.

The protrusion provided on the lower bush 120 for generating the fitting sound has a plurality of the non-annular protrusions 123b provided at intervals in the circumferential direction. Thus, a clearance is formed between the adjacent non-annular protrusions 123b, and the sound generated when the fitting is completed can be effectively propagated to the outside. Therefore, the operator can more reliably confirm that the upper bush 110 and the lower bush 120 are fitted to each other.

Since the inclination angle $\alpha$ of the first inclined surface 123b1 is larger than the inclination angle $\beta$ of the second inclined surface 123b2, the following advantages can be obtained. That is, in the process in which the lower bush 120 is fitted to the upper bush 110, a large resisting force is generated when the non-annular protrusion 123b overrides the annular protrusion 113b and thus, at the moment of fitting, they can return to the original shapes like being strongly flipped. This generates a large sound. Furthermore, when a manufacturing method of insert molding of the lower bush 120 using a die (not shown) which opens in a vertical direction in FIG. 3 is employed, for example, the plurality of non-annular protrusions 123b are undercut. Thus, when a molding product is being taken out of the die, so-called forced extraction needs to be performed. However, the relationship between the inclination angle $\alpha$ and the inclination angle $\beta$ as above allows the forced extraction to be performed without affecting the non-annular protrusions 123b.

(Others)

The above-described embodiment illustrates the structure in which the annular protrusion 113*b* is provided on the upper bush 110, and the plurality of non-annular protrusions 123*b* are provided on the lower bush 120 at intervals in the circumferential direction. However, in the present disclosure, a plurality of non-annular protrusions may be provided on the upper bush at intervals in the circumferential direction, and an annular protrusion may be provided on the lower bush. This structure can achieves the same effect as that in the above-described embodiment.

REFERENCE SIGNS LIST

10 Center bearing support
11 Center-bearing support main body
12 Bracket
12*a* Long hole
20 Body
21 Female screw
30 Shaft portion
100 Vibration-proof bush
110 Upper bush
111 Inner ring
111*a* Cylindrical portion
111*b* Outward flange portion
112 First outer ring
113 First elastic body
113*a* Annular portion
113*b* Annular protrusion
120 Lower bush
121 Second inner ring
121*a* Inner peripheral surface
122 Second outer ring
123*a* Annular portion
123*b* Non-annular protrusion

The invention claimed is:

1. A vibration-proof bush provided in a center bearing support which supports a center bearing of a propeller shaft, comprising:

an upper bush configured to be mounted on a vehicle body side, the upper bush has a first inner ring of metal, a first outer ring of metal provided concentrically with the first inner ring, and a first elastic body provided integrally with the first inner ring and the first outer ring;

a lower bush configured to be fitted to the upper bush, the lower bush has a second inner ring of metal, a second outer ring of metal provided concentrically with the second inner ring, and a second elastic body provided integrally with the second inner ring and the second outer ring; and wherein the vibration-proof bush includes interference portions configured to interfere with each other in a process of fitting the lower bush to the upper bush, and the interference portions form a fitting-sound generation structure in which a sound is configured to be generated upon fitting the lower bush to the upper bush during temporary assembling, the interference portions are defined by a protrusion provided on each of the upper bush and the lower bush, respectively, among the protrusions constituting the interference portions, the protrusion provided on the upper bush has an annular protrusion, and the protrusions provided on the lower bush has non-annular protrusions provided in plural at intervals in a circumferential direction, each of the plurality of non-annular protrusions includes a first inclined surface in which a distance from a center axis of the lower bush increases as a distance from the upper bush increases, and a second inclined surface in which a distance from the center axis increases as a distance from the upper bush decreases, the second inclined surface being provided closer to the upper bush than the first inclined surface; and an inclination angle of the first inclined surface with respect to a plane perpendicular to the center axis is larger than an inclination angle of the second inclination surface with respect to the plane perpendicular to the center axis.

2. The vibration-proof bush according to claim 1, wherein the protrusions are deformed by pressing each other in the process of fitting the lower bush to the upper bush during the temporary assembling, and the sound is generated by the protrusions returning to their original shapes upon completion of the fitting.

3. The vibration-proof bush according to claim 1, wherein an outer peripheral surface of the first elastic body and an inner peripheral surface of the second elastic body are configured to be fitted to each other, and the annular protrusion is provided on the outer peripheral surface of the first elastic body, and a plurality of the non-annular protrusions are provided on the inner peripheral surface of the second elastic body.

\* \* \* \* \*